United States Patent
Samboursky et al.

(10) Patent No.: US 8,331,697 B2
(45) Date of Patent: Dec. 11, 2012

(54) SYSTEM AND A METHOD FOR A POST PRODUCTION OBJECT INSERTION IN MEDIA FILES

(76) Inventors: Jacob Samboursky, Hertzelia (IL); Uri Rotshtein, Kfar-Saba (IL)

( * ) Notice: Subject to any disclaimer, the term of this patent is extended or adjusted under 35 U.S.C. 154(b) by 1212 days.

(21) Appl. No.: 11/935,888

(22) Filed: Nov. 6, 2007

(65) Prior Publication Data
US 2009/0116754 A1    May 7, 2009

(51) Int. Cl.
*G06K 9/68* (2006.01)
*H04N 9/74* (2006.01)

(52) U.S. Cl. ........ 382/219; 382/284; 382/291; 382/294; 348/580; 348/584; 348/589

(58) Field of Classification Search ................. 382/219, 382/284, 294; 348/580, 584, 589
See application file for complete search history.

(56) References Cited

U.S. PATENT DOCUMENTS

| | | | | |
|---|---|---|---|---|
| 5,353,392 A | * | 10/1994 | Luquet et al. ................ | 345/632 |
| 5,566,251 A | * | 10/1996 | Hanna et al. ................ | 382/284 |
| 5,923,791 A | * | 7/1999 | Hanna et al. ................ | 382/295 |
| 6,181,345 B1 | * | 1/2001 | Richard ........................ | 345/419 |
| 2011/0273619 A1 | * | 11/2011 | Kamei ........................... | 348/584 |

FOREIGN PATENT DOCUMENTS

| | | |
|---|---|---|
| KR | 2003 0002919 | 1/2003 |
| WO | WO 93/06691 | 4/1993 |

OTHER PUBLICATIONS

International Search Report issued on Mar. 17, 2009 for PCT/IL2008/001464.
Written Opinion of the International Search Authority issued on Mar. 17, 2009 for PCT/IL2008/001464.

* cited by examiner

*Primary Examiner* — Matthew Bella
*Assistant Examiner* — Patrick Edwards
(74) *Attorney, Agent, or Firm* — Marty Fleit; Paul D. Bianco; Fleit Gibbons Gutman Bongini Bianco PL

(57) ABSTRACT

Disclosed are a system and a method for a computerized automatic placement of objects in media files in post-production. Embodiments of the present invention enable the automatic placement of objects which appear in a media file, such as a digital video file. According to one embodiment of the present invention, the disclosed system and method allow the replacement of a specific pattern which appears in a given video file with a new image, in a fully transparent manner. According to embodiments of the present invention the makers of the media file place a designated pattern in the media file, such as a sticker on an object. Embodiments of the present invention enable the replacing of a new image on the designated pattern on the sticker with a new image.

23 Claims, 5 Drawing Sheets

SYSTEM AND A METHOD FOR A POST PRODUCTION OBJECT INSERTION IN MEDIA FILES

FIELD OF INVENTION

The present invention relates in general to the field of digital media files, more particularly it relates to systems and methods for the automatic insertion of objects in media files.

BACKGROUND OF THE PRIOR ART

Placing products and commercial advertisements in media files, such as video files, is a well known method for advertising brands. As advertising campaigns become more dynamic and targeted according to their perspective clients, the need to be able to change and update the advertisements appearing in media files becomes more apparent. However, existing art for inserting segments of a captured image in a video file prove to consume significant manual intervention, extensive preparations for this option during the production of the media file or produce poor visual results. There is therefore a need for a system and a method which would enable advertisers to insert the commercial advertisements in media files in a fully automatic seamless manner and in high quality so that the inserted object will not appear to be artificially inserted. The proposed system and method should provide a solution which can be implemented in the post production stages of preparing the media file, both in on-line and in off-line modes.

SUMMARY OF INVENTION

Disclosed is a method for the automatic placement of a new image into a captured image, wherein the captured image is a frame in a digital video and the automatic placement is performed by a computerized unit in post-production. The method comprises the steps of placing at least one designated pattern in the captured image, identifying the location and visual characteristics of the designated pattern in the captured image. The method also includes the steps of manipulating the new image wherein the manipulation applies at least one of the visual characteristics of the designated pattern in the captured image onto the new image and integrating the manipulated new image in the captured image in the location of the designated pattern. The method enables the creation of a visual impression as if the new image is an integral part of the captured image. The placing of the designated pattern may be performed in pre-production or in post-production. The integration of the image in post-production may be performed manually, automatically, or in a semi-automatic manner. According to some embodiments of the present invention the captured image may also be a still photograph.

The identified characteristics of the designated pattern in the captured image may include the size of the designated pattern and the manipulation may include setting the size of the new image to the identified size of the designated pattern. The identified characteristics of the designated pattern in the captured image may include the three-dimensional distortion of the designated pattern and the manipulation may include creating the three-dimensional distortion of the designated pattern in the new image. The identified characteristics of the designated pattern in the captured image may include the lighting characteristics of the designated pattern and the manipulation may include setting the lighting characteristics of the new image to the identified lighting characteristics of the designated pattern. The identified characteristics of the designated pattern in the captured image may include the partial concealment of the designated pattern and the manipulation may include the cutting of the equivalent segments out of the new image. The identified characteristics of the designated pattern in the captured image may include the reflections on the designated pattern and the manipulation may include the creation of the reflections on the new image.

The method may further include the step of integrating the manipulations of the new image. The method may also include the step of managing the replacement of the designated pattern with the new image using a management tool. The management tool enables the selection of the new image in accordance with the viewing conditions of the media file. The viewing conditions may relate to the geographic location of the viewer, the period of time of the viewing, the characteristics of the viewer, or the medium through which the file is viewed. The designated pattern may include information indicating to the viewer that the replacement should be performed.

Also disclosed is a system for the automatic placement of a new image into a captured image, wherein the captured image is a frame in a digital video and the automatic placement is performed by a computerized unit in post-production. The system comprises at least one designated pattern wherein the designated pattern is placed in the captured image, a module for identifying the location of the designated pattern in the captured image, and a module for identifying the visual characteristics of the designated pattern in the captured image. The system also includes a module for manipulating the new image wherein the manipulation applies at least one of the visual characteristics of the designated pattern in the captured image onto the new image and a module for integrating the manipulated new image in the captured image in the location of the designated pattern The system enables the creation of a visual impression as if the new image is an integral part of the captured image.

The designated pattern is designed to facilitate its distinction from other patterns in the captured image, and to facilitate the identification of the characteristics of the designated pattern in the captured image.

The system may also include an algorithm for identifying the size of the designated pattern and manipulating the size of the new image to the identified size of the designated pattern. The system may also include an algorithm for identifying the three-dimensional distortion of the designated pattern and creating the three dimensional distortion of the designated pattern in the new image. The system may also include an algorithm for identifying the lighting characteristics of the designated pattern and setting the lighting characteristics of the new image to the identified lighting characteristics of the designated pattern. The system may also include an algorithm for identifying the partial concealment of the designated pattern and cutting the equivalent segments out of the new image. The system may also include an algorithm for identifying the reflections on the designated pattern and creating the reflections on the new image. The system may also include a module for integrating the manipulations of the new image by the computerized unit.

The system may also include a management tool for managing the replacement of the designated pattern with the new image. The management tool enables the selection of the new image in accordance with the viewing conditions of the media file. The system may further include a module for integrating the designated pattern in post-production.

BRIEF DESCRIPTION OF THE DRAWINGS

The subject matter regarded as the invention will become more clearly understood in light of the ensuing description of embodiments herein, given by way of example and for purposes of illustrative discussion of the present invention only, with reference to the accompanying drawings, wherein.

Figure 1:
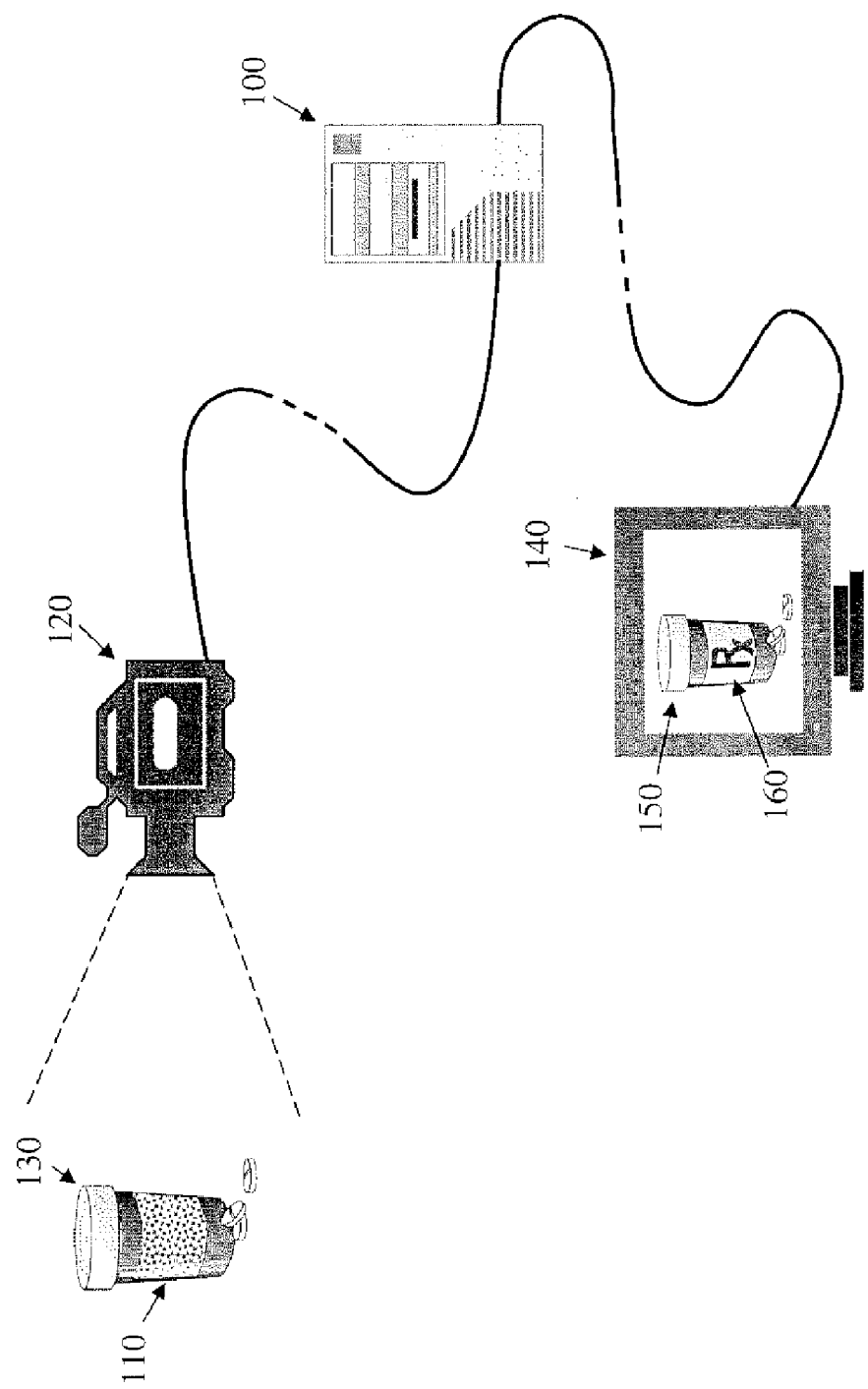
FIG. 1 is a schematic illustration of the environment in which the disclosed system and method operate in accordance with embodiments of the present invention.

The drawings together with the description make apparent to those skilled in the art how the invention may be embodied in practice.

No attempt is made to show structural details of the invention in more detail than is necessary for a fundamental understanding of the invention.

It will be appreciated that for simplicity and clarity of illustration, elements shown in the figures have not necessarily been drawn to scale. For example, the dimensions of some of the elements may be exaggerated relative to other elements (or clarity. Further, where considered appropriate, reference numerals may be repeated among the figures to indicate corresponding or analogous elements.

DESCRIPTION OF SOME EMBODIMENTS OF THE INVENTION

The present invention is a system and a method for a computerized automatic placement of objects in media files in post-production. Embodiments of the present invention enable the automatic placement of objects which appear in a media file, such as a digital video file. According to other embodiments of the present invention the media file may also be a still photograph. According to one embodiment of the present invention, the disclosed system and method allow the replacement of a specific pattern which appears in a given video file with a new image, in a fully transparent manner. Viewers of the video file will not notice that a new image has been integrated into the video file after the video was shot. According to embodiments of the present invention the makers of the media file place a designated pattern in the media file, such as a sticker on an object. According to embodiments of the present invention the disclosed system and method enable the replacing of a new image on the designated pattern on the sticker with a new image. Thus, for instance, the makers of the media file are able to place advertisements or locally related information in the media file during post-production stages. The content of the placed advertisements may therefore be determined according to region, medium and even personalized in accordance with the characteristics of expected viewers.

An embodiment is an example or implementation of the inventions. The various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "one embodiment", "an embodiment", "some embodiments" or "other embodiments" means that a particular feature, structure, or characteristic described in connection with the embodiments is included in at least one embodiments, but not necessarily all embodiments, of the inventions. It is understood that the phraseology and terminology employed herein is not to be construed as limiting and are for descriptive purpose only.

The principles and uses of the teachings of the present invention may be better understood with reference to the accompanying description, figures and examples. It is to be understood that the details set forth herein do not construe a limitation to an application of the invention. Furthermore, it is to be understood that the invention can be carried out or practiced in various ways and that the invention can be implemented in embodiments other than the ones outlined in the description below.

It is to be understood that the terms "including", "comprising", "consisting" and grammatical variants thereof do not preclude the addition of one or more components, features, steps, or integers or groups thereof and that the terms are to be construed as specifying components, features, steps or integers. The phrase "consisting essentially of", and grammatical variants thereof, when used herein is not to be construed as excluding additional components, steps, features, integers or groups thereof but rather that the additional features, integers, steps, components or groups thereof do not materially alter the basic and novel characteristics of the claimed composition, device or method.

If the specification or claims refer to "an additional" element, that does not preclude there being more than one of the additional element. It is to be understood that where the claims or specification refer to "a" or "an" element, such reference is not be construed that there is only one of that element. It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks. The term "method" refers to manners, means, techniques and procedures for accomplishing a given task including, but not limited to, those manners, means, techniques and procedures either known to, or readily developed from known manners, means, techniques and procedures by practitioners of the art to which the invention belongs. The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined. The present invention can be implemented in the testing or practice with methods and materials equivalent or similar to those described herein.

The terms "bottom", "below", "top" and "above" as used herein do not necessarily indicate that a "bottom" component is below a "top" component, or that a component that is "below" is indeed "below" another component or that a component that is "above" is indeed "above" another component. As such, directions, components or both may be flipped, rotated, moved in space, placed in a diagonal orientation or position, placed horizontally or vertically, or similarly modified. Accordingly, it will be appreciated that the terms "bottom", "below", "top" and "above" may be used herein for exemplary purposes only, to illustrate the relative positioning or placement of certain components, to indicate a first and a second component or to do both.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

FIG. 1 is a schematic illustration of the environment in which the disclosed system and method operate in accordance with embodiments of the present invention. Video camera 120 captures object 130 which includes designated pattern 110. Designated pattern 110 was placed on object 130 by the makers of the video file. Computing system 100 identifies captured designated pattern 110, replaces the designated pattern with a new image and adjusts the new image to the characteristics of captured designated pattern 110. The result is displayed on monitor 140. The result includes the image 150 of captured object 130 with new image 150.

Figure 2:
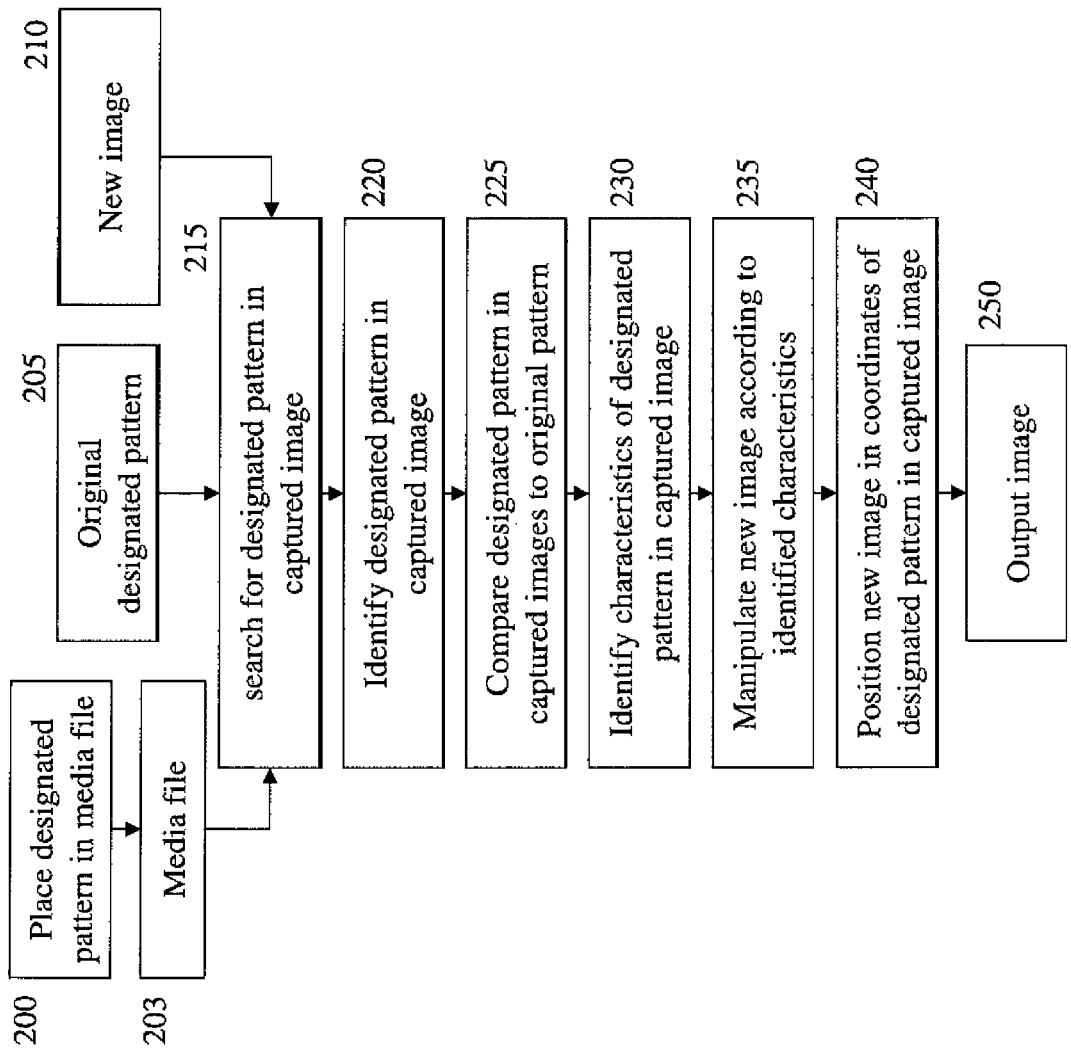
FIG. 2 is a flowchart illustrating a pattern replacement procedure in accordance with embodiments of the present invention.

According to embodiments of the present invention, in order to perform the replacement of the pattern in the captured image the proposed system and method perform a pattern replacement procedure. FIG. 2 is a flowchart illustrating a pattern replacement procedure in accordance with embodiments of the present invention. First, the designated pattern is placed on an object which is captured in the media file (step 200). According to some embodiments of the present invention the pattern is placed during the production stages on a captured image. According to other embodiments of the present invention the pattern is added to the media file in post production stages. Then, as input, the pattern replacement procedure receives the designated pattern in its original state (step 205), the media file (step 203) and the new image (step 210). Then, the procedure searches for the designated pattern in the captured image (step 215). Having identified the designated pattern in the captured image (step 220), the procedure compares the captured designated pattern with the designated pattern in its original state (step 225). This comparison enables the procedure to identify the characteristics of the designated pattern as they appear in the captured image (step 230).

The characteristics of the designated pattern as it appears in the captured image may include any number of transformations. These transformations occur as a result of the capturing conditions of the object on which the designated pattern is located. For instance, these characteristics may include changes due to lighting conditions, partial concealments, and changes in the size and angle of the pattern. According to these characteristics, the process manipulates the new image (step 235). Thus, the new image receives the characteristics of the designated pattern, as it was captured. Finally the process positions the new image in the coordinates of the designated pattern in the captured image, wherein the new manipulated pattern completely covers the designated pattern. The output image includes the new image instead of the designated pattern in a manner which is completely transparent to the viewer (step 250). According to embodiments of the present invention, when processing a video file, the pattern replacement procedure is repeated for each frame sequentially.

Figure 3:
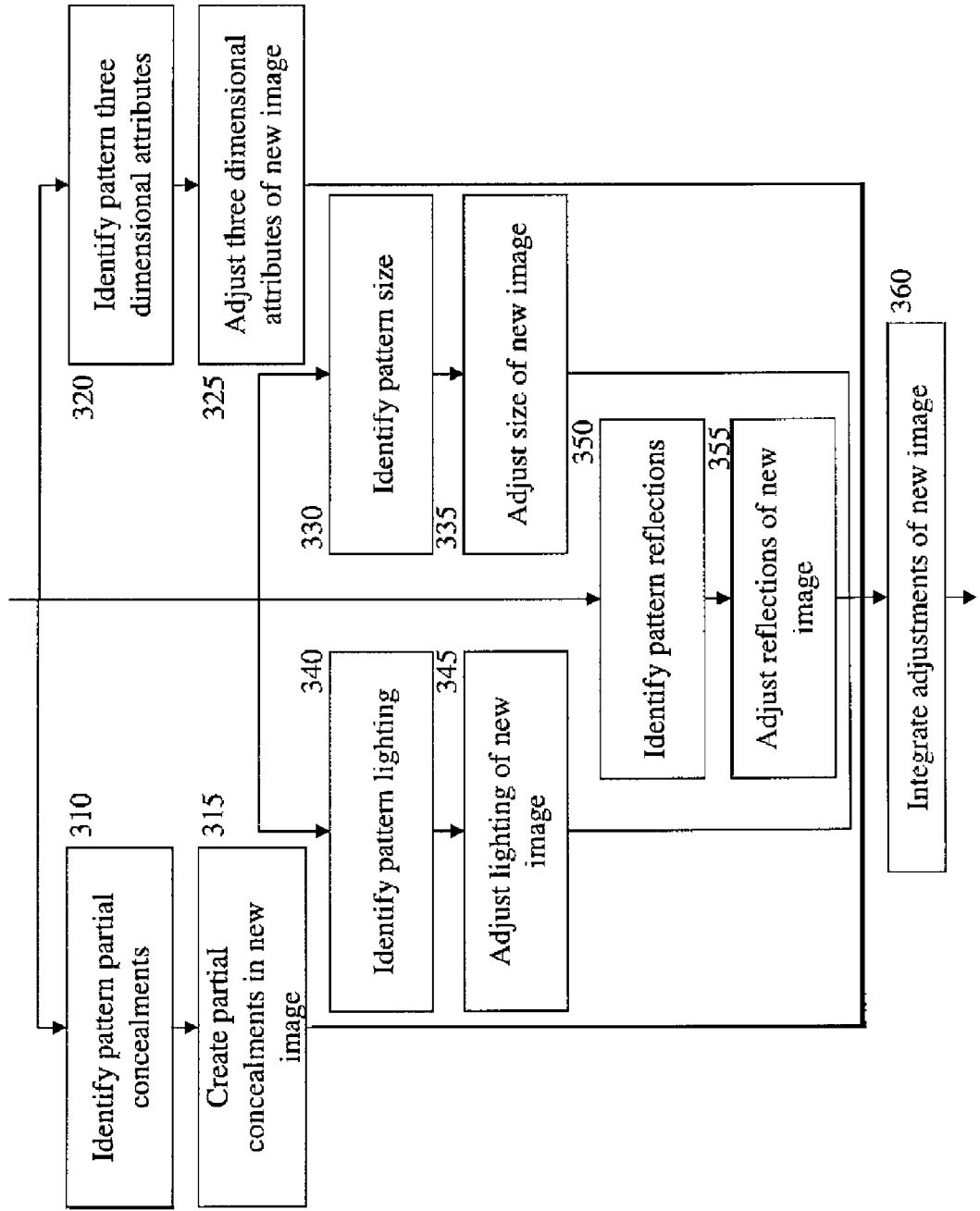
FIG. 3 is a detailed flowchart illustrating the principal components in the procedure of pattern characteristics identification and manipulation in accordance with embodiments of the present invention.

FIG. 3 is a detailed flowchart illustrating algorithms in the procedure of pattern characteristics identification and manipulation in accordance with embodiments of the present invention. As mentioned above, the algorithms of the procedure identify the characteristics of the designated pattern by comparing the designated pattern in the captured image to the designated pattern in its original state. According to embodiments of the present invention the pattern characteristics identification procedure may include any number of algorithms for identifying the different characteristics of the designated pattern in the captured image.

For instance, the procedure may include an algorithm for identifying partial concealment of the designated pattern (310). Accordingly, the procedure cuts the new image to fit the partial concealment of the designated pattern in the captured image (step 315). The procedure may include an algorithm for identifying the three-dimensional attributes of the designated pattern in the captured frame (step 320) and adjusts the new image accordingly (step 325). The three-dimensional attributes may include the angle of the pattern in the X, Y and Z dimensions, the curves, folds and the like. Similarly, the procedure may include an algorithm for identifying the size of the designated pattern in the captured image (step 330) and change the size of the new image accordingly (step 335). Another characteristic which an algorithm of the procedure may identify is the lighting and shading on the designated pattern in the captured image (step 340) and change the lighting and shading of the new image to mimic the lighting effects (step 345). Finally, the procedure may include an algorithm for identifying the reflections created on the designated pattern in the captured image (step 350) and create these reflections on the new image (step 355).

Having executed each of the relevant algorithms on the designated pattern in the captured image and performed the manipulation of the new image accordingly, the procedure integrates all manipulations of the new image to one single pattern (step 360). This manipulated new image is then ready to be inserted into the captured image and replace the designated pattern in a seamless manner, as described above.

Figure 4:
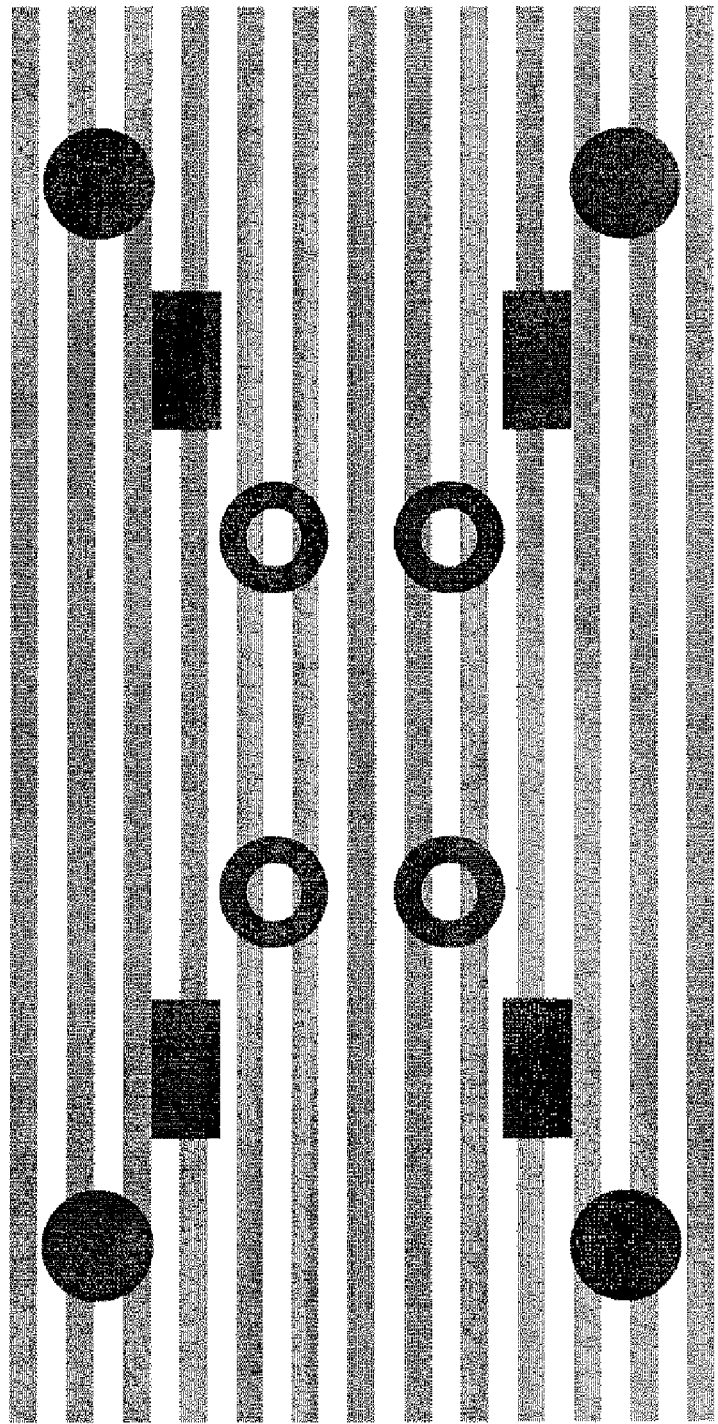
FIG. 4 is an illustration of one possible designated pattern in accordance with embodiments of the present invention.

According to embodiments of the present invention, in order to perform the above-described identifications and manipulations, the designated pattern is designed to enable the discrete recognition of each segment of the designated pattern. FIG. 4 is an illustration of one possible designated pattern in accordance with embodiments of the present invention. The designated pattern may include any number of features which may aid in the pattern replacement procedure as described above. For instance, the designated pattern may include an unconventional combination of colors, such as colors with a unique Hue Saturation Value (HSV), which may aid in identifying and distinguishing it from its surroundings and in identifying partial concealments of the pattern. The colors of the designated pattern may appear in a fixed frequency. The size of the designated pattern in the captured image may be easily identified according to the frequency of the colors. Similarly, the designated pattern may include a particular combination of shapes which may aid in distinguishing between it and other designated patterns provided that more than one designated pattern is used in a single media file. For instance, the shapes may be positioned along the diagonal lines of the pattern to aid in the identification of the corners of the pattern in any angle. The designated pattern may also include features which may aid in distinguishing between its different segments. Thus, if the pattern is partly concealed, the procedure may identify which part of the designated pattern is exposed. The designated pattern may include any other combination of features which may aid in the procedure of identifying it and its characteristics. Additionally, according to some embodiments, the designated pattern may include any kind of visual disturbance or an indication for the fact that in the viewed copy the pattern has not been replaced yet and it is therefore not an authorized copy for viewing.

According to additional embodiments of the present invention, the proposed system and method also include a management system for managing the operation of the pattern replacing in the media file. The management system enables users of the system to select the new image to be used thus providing the users of the system full control over the end product. Additionally, using the management system users of the system may optionally determine the criteria according to which the new image is selected. Using the management system the users of the system can define that the selected new image is determined according to any combination of conditions concerning the viewing conditions of the viewers of the media file. For instance, the users of the system may determine which new image is used according to conditions such as the geographic location of the viewers of the media file, a particular medium the viewers of the media file are using, the particular period of time in which the media file is viewed, or any combination thereof.

Figure 5:
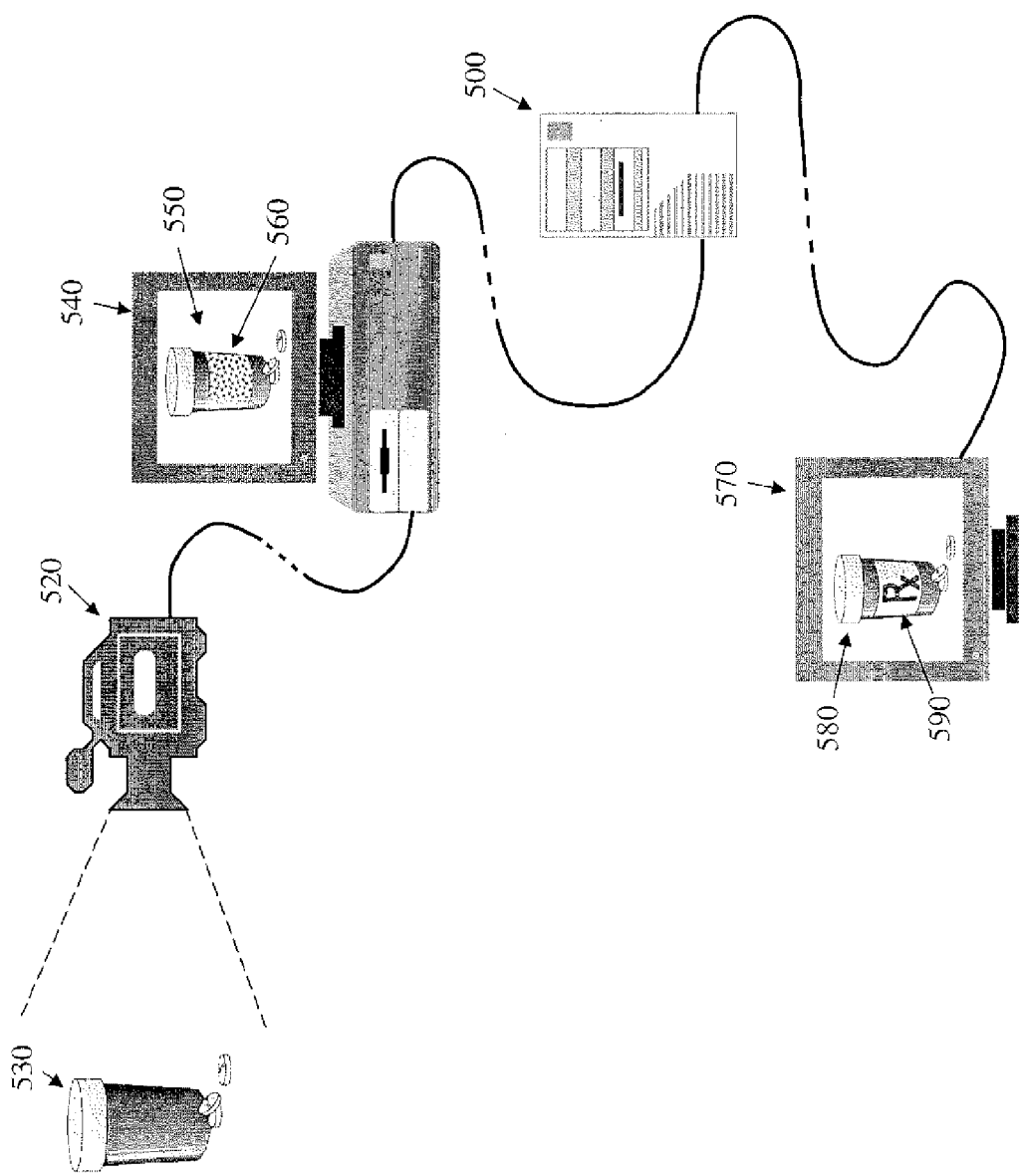
FIG. 5 is a schematic illustration of the environment in which the disclosed system and method operate in accordance with additional embodiments of the present invention.

As mentioned above, according to embodiments of the present invention the designated pattern may be integrated into the captured image in post production. This embodiment is illustrated in FIG. 5. Object 530 is captured by video camera 120. During the post production stages pattern 560 is inserted into the media file. According to some embodiments, pattern 560 may be placed in media file in relation to captured object 550. The integration of the designated pattern into the captured image may be performed manually, automatically or using a semi-automatic method using video editing means 540. Once the designated pattern is integrated into the captured image, the pattern replacing method and system may be performed as described herein. Computing system 500 identifies designated pattern 560, replaces the designated pattern with a new image and adjusts the new image to the characteristics of captured designated pattern 560. The result is displayed on monitor 570. The result includes the image 580 of captured object 530 with new image 590. Integrating the designated pattern into the captured image may enable the dynamic replacing of a segment or of an object in the captured image, even if the designated pattern was not used during the filming of the media file.

It should be understood that some embodiments of the invention can optionally be implemented, for example, using a machine-readable medium or article which can optionally store an instruction or a set of instructions that, if executed by a machine, cause the machine to perform a method or operations or both in accordance with embodiments of the invention. Such a machine can optionally include, for example, any suitable processing platform, computing platform, computing device, processing device, computing system, processing system, computer, processor, or the like, and can optionally be implemented using any suitable combination of hardware or software or both. The machine-readable medium or article can optionally include but is not limited to, any suitable type of memory unit, memory device, memory article, memory medium, storage article, storage device, storage medium or storage unit such as, for example, memory, removable or non-removable media, erasable or non-erasable media, writeable or re-writeable media, digital or analog media, optical disk, hard disk, floppy disk, Compact Disk Recordable (CD-R), Compact Disk Read Only Memory (CD-ROM), Compact Disk Rewriteable (CD-RW), magnetic media, various types of Digital Versatile Disks (DVDs), a rewritable DVD, a tape, a cassette, or the like. The instructions can optionally include any suitable type of code, for example, an executable code, a compiled code, a dynamic code, a static code, interpreted code, a source code or the like, and can optionally be implemented using any suitable high-level, low-level, object-oriented, visual, compiled or interpreted programming language. Stick a compiled or interpreted programming language can optionally be, for example, C, C++, C#, .Net, Java, Pascal, MATLAB, BASIC, Cobol, Fortran, assembly language, machine code and the like.

While the invention has been described with respect to a limited number of embodiments, these should not be construed as limitations on the scope of the invention, but rather as exemplifications of some of the embodiments. Those skilled in the art will envision other possible variations, modifications, and applications that are also within the scope of the invention. Accordingly, the scope of the invention should not be limited by what has thus far been described, but by the appended claims and their legal equivalents. Therefore, it is to be understood that alternatives, modifications, and variations of the present invention are to be construed as being within the scope and spirit of the appended claims.

What is claimed is:

1. A method for integrating new images into video frames, said method comprising:

physically attaching at least one designated pattern onto at least one-object, wherein each said designated pattern comprises a known geometrical pattern including a combination of shapes including a plurality of different colors;

providing a video frame including at least one image of said object having the pattern attached thereto;

identifying the location of the image of the object having the pattern attached thereto in the video frame at a post-production stage;

identifying visual characteristics of the image of the object by identifying visual changes between the image of the pattern over the image of the object in the video frame, said visual changes are caused by combination of the following (i) changes in the size of the pattern image in relation to the original size thereof, (ii) shading characteristics of the object image having the pattern image thereover caused due to illumination conditions, and angular positioning of the object when the frame was captured and (iii) changes between the known colors of said known pattern and the colors in the identified pattern image;

visually manipulating at least one new image, by adjusting visual characteristics of the new image according to said identified visual characteristics of said object image in said captured image; and integrating said manipulated new image in said captured image in the identified location of said pattern image, by replacing said pattern image with said manipulated new image, wherein said identification is enabled where the object is movable through digital video sequence;

wherein said integration is performed by using a computerized unit in post-production.

2. The method of claim 1 wherein said characteristics include the size of said designated pattern and said manipulation includes setting the size of said new image to said identified size of said designated pattern.

3. The method of claim 1 wherein said characteristics include the three-dimensional distortion of said designated pattern and said manipulation includes creating said three-dimensional distortion of said designated pattern in said new image.

4. The method of claim 1 wherein said characteristics include the lighting characteristics of said designated pattern and said manipulation includes setting the lighting characteristics of said new image to said identified lighting characteristics of said designated pattern.

5. The method of claim 1 wherein said characteristics include the partial concealment of said designated pattern and said manipulation includes the cutting of the equivalent segments out of said new image.

6. The method of claim 1 wherein said characteristics further include reflections on said designated pattern and said manipulation includes creation of said reflections on said new image.

7. The method of claim 1 further including the step of integrating said manipulations of said new image.

8. The method of claim 1 further including the step of managing said replacement of said designated pattern with said new image using a management tool.

9. The method of claim 8, wherein said management tool is configured to allow a user to manually select said new image for further manipulation and integration thereof, said selecting is enabled by allowing the user to first view each said designated pattern image of each said frame in the video sequence and selecting said new image according to each said designated pattern image.

10. The method of claim 9, wherein said management tool enables the selection of said new image in accordance with viewing conditions of said media file, said viewing conditions includes at least one of the following: the geographic location of the viewer, the period of time of the viewing, the characteristics of the viewer, the medium through which the file is viewed.

11. The method of claim 9 wherein said integration is at least one of the following: manual, automatic, semi-automatic.

12. The method of claim 1 wherein said designated pattern includes information indicating to the viewer that said replacement should be performed.

13. A system for integrating of a new image into a video, said system comprising:
at least one designated pattern attached onto an object in pre-production of the video, said designated pattern image comprises a known geometrical pattern including a combination of shapes including a plurality of different colors;
a module which identifies the location of said designated pattern image in said captured image;
a module which identifies visual characteristics of the image of said object by identifying visual changes between said captured image of said designated pattern and the original geometric pattern of said designated pattern, said visual changes are caused due to the combination of the following: (i) changes in the size of the pattern image in relation to the original size thereof, (ii) illumination applied on the object when its image was captured and (iii) the view from which the object image was taken in the respective frame;
a module which manipulates said new image by adjusting at least one visual characteristic of said new image according to said identified visual characteristics of said designated pattern image; and
a module which integrates said manipulated new image in said captured image in said location of said designated pattern,
wherein said integration is performed by using a computerized unit in post-production.

14. The system of claim 13 wherein said designated pattern is designed to facilitate the distinction of said designated pattern from other patterns in said captured image.

15. The system of claim 13 wherein said designated pattern is designed to facilitate the identification of said characteristics of said designated pattern in said captured image.

16. The system of claim 13 further including an algorithm for identifying the size of said designated pattern and manipulating the size of said new image to said identified size of said designated pattern.

17. The system of claim 13 further including an algorithm for identifying the three-dimensional distortion of said designated pattern and creating said three-dimensional distortion of said designated pattern in said new image.

18. The system of claim 13 further including an algorithm for identifying the lighting characteristics of said designated pattern and setting the lighting characteristics of said new image to said identified lighting characteristics of said designated pattern.

19. The system of claim 13 further including an algorithm for identifying the partial concealment of said designated pattern and cutting the equivalent segments out of said new image.

20. The system of claim 13 further including an algorithm which allows identifying reflections on said designated pattern from said designated pattern image and said module which manipulates said new image allow creating said reflections on said new image.

21. The system of claim 13 further including a management tool for managing said replacement of said designated pattern with said new image.

22. The system of claim 21 wherein said management tool enables a user to manually select a new image.

23. The system of claim 13 further including a module for integrating said designated pattern in post production.

* * * * *